United States Patent
Lin et al.

(10) Patent No.: US 11,892,855 B2
(45) Date of Patent: Feb. 6, 2024

(54) ROBOT WITH PERCEPTION CAPABILITY OF LIVESTOCK AND POULTRY INFORMATION AND MAPPING APPROACH BASED ON AUTONOMOUS NAVIGATION

(71) Applicant: ZHEJIANG UNIVERSITY, Zhejiang (CN)

(72) Inventors: Tao Lin, Zhejiang (CN); Guoqiang Ren, Zhejiang (CN); Zhixian Lin, Zhejiang (CN); Jinfan Xu, Zhejiang (CN); Huanyu Jiang, Zhejiang (CN); K. C Ting, Zhejiang (CN); Yibin Ying, Zhejiang (CN)

(73) Assignee: ZHEJIANG UNIVERSITY, Zhe jiang (CN)

( * ) Notice: Subject to any disclaimer, the term of this patent is extended or adjusted under 35 U.S.C. 154(b) by 366 days.

(21) Appl. No.: 17/426,596

(22) PCT Filed: Aug. 20, 2019

(86) PCT No.: PCT/CN2019/101574
§ 371 (c)(1),
(2) Date: Jul. 28, 2021

(87) PCT Pub. No.: WO2020/192000
PCT Pub. Date: Oct. 1, 2020

(65) Prior Publication Data
US 2022/0147053 A1  May 12, 2022

(30) Foreign Application Priority Data

Mar. 27, 2019 (CN) .......................... 201910238750.5

(51) Int. Cl.
*G05D 1/02* (2020.01)
*G01S 17/89* (2020.01)
(Continued)

(52) U.S. Cl.
CPC ............ *G05D 1/0274* (2013.01); *G01S 17/89* (2013.01); *G01S 17/931* (2020.01); *G05D 1/024* (2013.01);
(Continued)

(58) Field of Classification Search
CPC .... G05D 1/021; G05D 1/0212; G05D 1/0219; G05D 1/0221; G05D 1/0231;
(Continued)

(56) References Cited

U.S. PATENT DOCUMENTS

2021/0329884 A1* 10/2021 Bassett .................. A01K 3/005

FOREIGN PATENT DOCUMENTS

CN        106873677 A * 6/2017
CN        109460029 A * 3/2019

* cited by examiner

*Primary Examiner* — Russell Frejd
*Assistant Examiner* — Sara J Lewandroski (57) ABSTRACT

A robot with the perception capability of livestock and poultry information and a mapping approach based on autonomous navigation are disclosed. The robot includes a four-wheeled vehicle (3), an autonomous navigation system, a motion module and an information acquisition module. The autonomous navigation system includes a LiDAR (10), a RGB-D camera (9), an inertial measurement unit (5), an odometer and a main control module (12). The information acquisition module includes two thermal imagers (6), an environmental detection sensor module (8) and a wireless transmission module (11). The robot is controlled in indoor working environment, and simultaneously information about surrounding environment during movement is obtained with the autonomous navigation system; positioning locations are obtained through data processing and a global map is constructed, which can improve positioning accuracy, reduce dependence on breeders, realize automatic (Continued)

environment detection. The present invention has the advantages of high efficiency, high economic benefits, and wide applicability.

8 Claims, 4 Drawing Sheets

(51) Int. Cl.
*G01S 17/931* (2020.01)
*G06T 7/579* (2017.01)
*G06N 7/00* (2023.01)
*H04W 4/40* (2018.01)
*G06F 7/58* (2006.01)
*G06N 7/01* (2023.01)

(52) U.S. Cl.
CPC ......... *G05D 1/0248* (2013.01); *G05D 1/0272* (2013.01); *G06N 7/01* (2023.01); *G06T 7/579* (2017.01); *H04W 4/40* (2018.02); *G05D 2201/0201* (2013.01); *G06F 7/58* (2013.01); *G06T 2207/10028* (2013.01); *G06T 2207/30252* (2013.01)

(58) Field of Classification Search
CPC .... G05D 1/0238; G05D 1/024; G05D 1/0242; G05D 1/0246; G05D 1/0248; G05D 1/0251; G05D 1/0253; G05D 1/0255; G05D 1/0257; G05D 1/0268; G05D 1/027; G05D 1/0272; G05D 1/0274; G05D 2201/02; G05D 2201/0201; H04W 4/33; H04W 4/38; G01S 17/88; G01S 17/89; G05B 2219/40; G05B 2219/40243

See application file for complete search history.

ROBOT WITH PERCEPTION CAPABILITY OF LIVESTOCK AND POULTRY INFORMATION AND MAPPING APPROACH BASED ON AUTONOMOUS NAVIGATION

CROSS REFERENCE OF RELATED APPLICATION

This is a U.S. National Stage under 35 U.S.C 371 of the International Application PCT/CN2019/101574, filed Aug. 20, 2019, which claims priority under 35 U.S.C. 119(a-d) to CN 201910238750.5, filed Mar. 27, 2019.

BACKGROUND OF THE PRESENT INVENTION

Field of Invention

The present invention relates to an intelligent agricultural equipment and an intelligent agricultural method for livestock and poultry, and more particularly to a robot with perception capability of livestock and poultry information and a mapping approach based on autonomous navigation.

Description of Related Arts

With the continuous development of society, intensive, large-scale and intelligent breeding industry inevitable. On the one hand, this kind of breeding industry is able to effectively increase productivity, save social resources, reduce costs, and bring higher social and economic benefits; on the other hand, it also meets the requirements of animal welfare, which is a necessary foundation for implementing standardized production and improving the quality of livestock products. Information such as animal behavior and environmental factors is an important indicator of the large-scale breeding production process. How to efficiently collect and manage this information brings new challenges to precision and intelligent breeding production.

At present, the livestock and poultry industry in China mainly adopts manual inspection, fixed-point monitoring and mobile inspection methods for information collection. Manual inspection requires the breeder to conduct inspection regularly every day, which has high labor intensity, low monitoring efficiency, and is dangerous and does not meet the requirements of animal welfare. Fixed-point monitoring is to install the testing equipment in a fixed location, which has high cost, few monitoring parameters, poor flexibility, and great limitations. The mobile inspection is mainly to place the inspection equipment on the track and control its movement on the track through remote control and other methods. However, the track laying is difficult, costly, and low in applicability, so it is inconvenient to lay the track twice in the existing breeding environment. With the gradual transformation of the breeding industry to a large-scale intensive production model, relatively structured livestock and poultry houses have been rapidly promoted in China, which also enables the robot technology to be widely applied in the livestock and poultry breeding industry. In recent years, some scholars have been trying to apply the robot technology, the artificial intelligence technology, information processing technology and other technologies to the livestock and poultry breeding industry, but it is still necessary for the breeder to enter the livestock and poultry house for sending control signals at close range, so the intelligence level is low and the application potential is low. The relatively structured environment in the livestock and poultry houses provides convenient conditions for the application of the robot technology, so that the autonomous navigation technology of intelligent robots is able to better complete the tasks in the livestock and poultry houses. However, the symmetrical structure of the livestock and poultry house also leads to a symmetrical mode in the positioning process, which enables the robot unable to determine the current unique pose and unable to accurately match the monitored animal information, environmental information and the relative position of the robot in the livestock and poultry house.

SUMMARY OF THE PRESENT INVENTION

In order to overcome the shortcomings of the existing technology, solve the problems in the background technology, and effectively solve the unique positioning problem under the symmetrical structure of the livestock and poultry house environment based on laser traditional autonomous navigation, the present invention provides a robot with the perception capability of livestock and poultry information and a mapping approach based on autonomous navigation. According to the present invention, the robot technology completely replaces the function of the breeder in the working link to realize fully automatic breeding production.

To achieve the object of the present invention, technical solutions of the present invention are as follows.

A robot with perception capability of livestock and poultry information based on autonomous navigation comprises a four-wheeled vehicle, an elevating platform located above the four-wheeled vehicle, and an autonomous navigation system, a motion module and an information acquisition module three of which are installed on the four-wheeled vehicle, wherein:

the autonomous navigation system comprises a light detection and ranging (LiDAR) for obtaining information about surrounding environment, a red-green-blue-depth (RGB-D) camera, an inertial measurement unit, an odometer and a main control module for information processing and control, wherein:
the LiDAR, the RGB-D camera, the inertial measurement unit, the odometer and the main control module are fixed to the four-wheeled vehicle;
the LiDAR, the RGB-D camera, the inertial measurement unit and the odometer are connected with the main control module;
the motion module comprises a direct current (DC) motor unit for controlling the robot to move forward, a push-rod motor unit for controlling up and down movement of the elevating platform, and a microcontroller for controlling a rotational speed and a rotational direction of the DC motor unit and the push-rod motor unit, wherein:
the DC motor unit comprises four DC motors installed at four corners of a bottom portion of the four-wheeled vehicle, respectively;
four output shafts of the four DC motors are connected with four wheels at the four corners of the bottom portion of the four-wheeled vehicle, respectively;
the push-rod motor unit comprises two push-rod motors fixed to a top of the four-wheeled vehicle;
two output ends of the push-rod motor unit are connected with the elevating platform for driving the elevating platform to move up and down;
the information acquisition module comprises two thermal imagers for collecting animal behavior information, an environmental detection sensor module for collecting environmental information and a wireless transmission module for data transmission, wherein the two thermal imagers are disposed at two sides of a bottom of the elevating platform, respectively; the environmental detection sensor module is disposed on the elevating platform.

Preferably, the robot further comprises a power management module which is connected with the LiDAR, the RGB-D camera, the inertial measurement unit, the odometer, the main control module, the DC motor unit, the push-rod motor unit, and the microcontroller.

Preferably, the DC motor unit and the push-rod motor unit are all connected with the microcontroller; the microcontroller is connected with the main control module; the main control module is configured to receive the information about the surrounding environment from the LiDAR for controlling the DC motor unit and the push-rod motor unit, so as to further drive the four-wheeled vehicle and the elevating platform to move; map autonomous construction and navigation are performed by simultaneous localization and mapping (SLAM).

Preferably, the two thermal imagers and the environmental detection sensor module are all electrically connected with the wireless transmission module, the wireless transmission module is connected with an external wireless receiver; the external wireless receiver is configured to receive environmental perception information collected by the thermal imagers and the environmental detection sensor module for storing and processing.

Preferably, the environmental detection sensor module comprises multiple sensors which are but not limited to sound sensor, temperature sensor, humidity sensor, light intensity sensor, hydrogen sulfide sensor, ammonia sensor and carbon dioxide sensor.

Also, the present invention provides an autonomous mapping method based on autonomous navigation, which comprises the steps of:

(S1) controlling the robot to move in indoor working environment, and simultaneously obtaining information about surrounding environment during movement with the LiDAR, the RGB-D camera, the inertial measurement unit and the odometer, wherein the information comprises obstacle distance information, image and depth information, pose information and odometer information in a local coordinate system, the pose information comprises first real-time global coordinates, the odometer information comprises second real-time global coordinates, speed, heading angle and wheel angular velocity;

(S2) receiving and processing the information about the surrounding environment through the main control module, obtaining positioning global coordinates, speed, heading angle and wheel angular velocity of the robot in a world coordinate system by coordinate transformation, wherein the world coordinate system is a three-dimensional coordinate system taking environment as a coordinate origin, the local coordinate system is a three-dimensional coordinate system with a four-wheeled vehicle as the coordinate origin;

(S3) defining the positioning global coordinates, speed, heading angle and wheel angular velocity of the robot in the world coordinate system to be a state vector of a Kalman filter, wherein the positioning global coordinates in the world coordinate system are obtained through processing the first real-time global coordinates and the second real-time global coordinates in the local coordinate system;

(S4) constructing a state model of the Kalman filter according to the state vector, constructing an observation model of the Kalman filter according to an observation model of the odometer, an observation model of the inertial measurement unit and an observation model of the LiDAR, solving the state model and the observation model of the Kalman filter according to Kalman filter algorithm, and obtaining an optimal solution of the state vector at time t;

(S5) determining the optimal solution of the state vector under the state model and the observation model of the Kalman filter in the step (S4) in combination with image information collected by the RGB-D camera and Monte Carlo real-time positioning and mapping algorithm, which comprises:

(S501) the robot moving in an area to be constructed on a map, judging whether the robot turns and whether there are obstacles during movement through the obstacle distance information collected by the LiDAR, judging whether there are characteristic road markings are captured through the image information collected by the RGB-D camera, performing feature matching on information collected by the LiDAR, the inertial measurement unit and the odometer in the area to be constructed on the map, and obtaining poses in the world coordinate system, wherein the poses are the global coordinates of the robot in the world coordinate system; and (S502) when the robot does not turn, no obstacles or no characteristic road markings are captured by the RGB-D camera during the movement of the robot, defining control vectors of the state model of the Kalman filter to be the poses in the world coordinate system;

when the robot turns, there are obstacles or characteristic road markings are captured by the RGB-D camera during the movement of the robot, defining the control vectors of the state model of the Kalman filter to be the optimal solution of the state vector; and (S6) iteratively solving the state model and the observation model of the Kalman filter, and obtaining locations, so that a global map is constructed.

Preferably, the step (S4) specifically comprises:

(S401): at time t, constructing the state vector $X_{c(t)}=[x_t, y_t, \theta_t, v_t, \omega_t]^T$, wherein $x_t$ and $y_t$ are the positioning global coordinates of the robot in the world coordinate system, $\theta_t$ is the heading angle of the robot in the world coordinate system, $v_t$ is the speed of the robot in the world coordinate system, $\omega_t$ is the wheel angular velocity of the robot in the world coordinate system, and T is matrix transposition;

(S402) constructing the state model of the Kalman filter according to formulas of $$X_{c(t+1)} = f(X_{c(t+1)}) + W_t,$$

$$X_{c(t+1)} = \begin{bmatrix} x_{t+1} \\ y_{t+1} \\ \theta_{t+1} \\ v_{t+1} \\ \omega_{t+1} \end{bmatrix} = \begin{bmatrix} x_t + v_t\cos(\theta_t + \omega_t\Delta t)\Delta t \\ y_t + v_t\sin(\theta_t + \omega_t\Delta t)\Delta t \\ \theta_t + \omega_t\Delta t \\ v_t \\ \omega_t \end{bmatrix} + W_t,$$

wherein $X_{c(t+1)}$ is the state vector at time t+1, $f(X_{c(t+1)})$ is a nonlinear state transition function of the state vector $X_{c(t+1)}$ at time t+1, $W_t$ is process noise of the Kalman filter, $\Delta t$ is time interval between two adjacent moments;

(S403) dividing the Kalman filter into a first sub-filter and a second sub-filter which are independent from each other and in parallel, wherein:

an observation model of the first sub-filter is expressed by $Z_{1(t+1)} = h_1 X_{c(t)} + W_{1(t)}$, which is specifically $$Z_{1(t+1)} = \begin{bmatrix} Z_{Las} \\ Z_{IMU} \end{bmatrix} = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 0 & 1 \end{bmatrix} X_{c(t)} + W_{1(t)},$$

here, $Z_{Las}$ is the observation model of the LiDAR, $Z_{IMU}$ is the observation model of the inertial measurement unit, $W_{1(t)}$ is a sum of noise of the LiDAR and the inertial measurement unit, $h_1$ is an observation matrix of the first sub-filter, an observation model of the second sub-filter is expressed by $Z_{2(t+1)} = h_2 X_{c(t)} + W_{2(t)}$, which is specifically $$Z_{2(t+1)} = \begin{bmatrix} Z_{odom} \\ Z_{IMU} \end{bmatrix} = \begin{bmatrix} 1 & 0 & 0 & 0 & 0 \\ 0 & 1 & 0 & 0 & 0 \\ 0 & 0 & 0 & 1 & 0 \\ 0 & 0 & 0 & 0 & 1 \\ 0 & 0 & 1 & 0 & 0 \\ 0 & 0 & 0 & 0 & 1 \end{bmatrix} X_{c(t)} + W_{2(t)},$$

here, $Z_{odom}$ is the observation model of the odometer, $W_{2(t)}$ is a sum of noise of the odometer and the inertial measurement unit, $h_2$ is an observation matrix of the second sub-filter; and (S404) processing covariance $Q_{(t)}$ and estimated error covariance $P_{(t)}$ of the process noise $W_t$ of the Kalman filter through formulas of $Q_{1(t')} = \alpha_1^{-1} Q_{(t)}$, $P_{1(t')} = (1 - \alpha_1^{-1}) P_{(t)}$, $Q_{2(t')} = \alpha_2^{-1} Q_{(t)}$, $Q_{2(t')} = \alpha_2^{-1} Q_{2(t)}$, $\overline{X}_{c(t)} = \overline{X}_{l(t)}$, wherein $Q_{1(t')}$ is covariance of the process noise of every sub-filter at time t, $P_{1(t')}$ is estimated error covariance of every sub-filter at time t, $\alpha_1$ is weight distribution coefficient of the first sub-filter; $Q_{2(t')}$ is covariance of the process noise of every sub-filter at time t, $P_{2(t')}$ is estimated error covariance of every sub-filter at time t, $\alpha_2$ is weight distribution coefficient of the second sub-filter; $\overline{X}_{c(t)}$ is global optimal solution of state vector at time t, $\hat{X}_{l(t)}$ is global optimal solution of state vector of every sub-filter at time t.

Preferably, the step (S6) specifically comprises:

(S601) converting a motion observation model to a likelihood function;

(S602) evenly dividing the area to be constructed on the map into multiple grids, scanning the area to be constructed on the map with the LiDAR, setting a grid with obstacles to 1, setting a grid without obstacles to 0, and obtaining a local grid map which is regarded as an initial global map;

(S603) creating particles based on Monte Carlo algorithm, taking positions of the particles as possible locations of the robot, performing weight fusion on the second real-time global coordinates obtained by the odometer and the first real-time global coordinates obtained by the inertial measurement unit in the world coordinate system, and obtaining new locations of the robot, which is expressed by formulas of $$P^i = P_{odom} \cdot \theta_{\Delta t} + P_{IMU} \cdot (1 - \theta_{\Delta t'}),$$

$$\theta_{(\Delta t')} = \frac{1}{1 + \left(\frac{\Delta t'}{\gamma}\right)^{2n}},$$

here, P is a position after weight and fusion, $P_{odam}$ is the second real-time global coordinates obtained by the odometer in the world coordinate system, $P_{IMU}$ is the first real-time global coordinates obtained by the inertial measurement unit in the world coordinate system, $\theta_{\Delta t'}$ is weight of the odometer, $\Delta t'$ is location duration time, $\gamma$ is stable location duration time that the second real-time global coordinates obtained by the odometer in the world coordinate system reaches, n is time index parameter which depends on actual situations and is generally 3;

(S604) describing a particle weight update method by Gaussian distribution with a mean value of 0 and a variance of $\sigma^2$, and updating a particle weight of the Monte Carlo algorithm, wherein the updated particle weight is expressed by a formula of $$w_k^i = \frac{1}{\sqrt{2\pi}\,\sigma} e^{\frac{-(x_k^i - x_0^i)^2 - (y_k^j - y_0^j)^2}{2\sigma^2}},$$

here, $(x_k^i, y_k^i)$ is position of the $i^{th}$ particle at time k, e is natural constant, $x_0^i$ and $y_0^i$ are initial positions of the $i^{th}$ particle, $\omega_k^i$ is weight of the $i^{th}$ particle at time k, k is time, and then normalizing the updated particle weight;

(S605) calculating a current location of the robot according to the normalized updated particle weight through a formula of $X_k = \Sigma_{i=1}^{n} (\omega_k^1 \cdot P^i)$, here, n is a total number of the particles, $P^i$ is a position of the $i^{th}$ particle after weight and fusion; and (S606) according to the normalized updated particle weight, abandoning particles with less weight $\omega_k^i$ and remaining particles with larger weight, which comprises:

(S6061) performing polynomial resample on the updated weights of all particles, and constructing a discrete cumulative distribution function by a formula of $F(i) = \Sigma_{m=1}^{i} \omega_k^i$, here, F(i) is a cumulative weight of the $i^{th}$ particle;

(S6062) generating a uniformly distributed random number set $\{u_j\}$ on [0,1], wherein $u_j$ is a set of random numbers generated above, j is the $j^{th}$ random number randomly generated in the set above, and judging the weight $\omega_k^i$, wherein the weight $\omega_k^i$ is smaller if $F_{(i)} \leq u_j$; the weight $\omega_k^i$ is larger if $F_{(i)} > u_j$, copying a current particle as a new particle, and setting a weight of the new particle to be 1/N; and (S6063) repeating polynomial resample in the step (S6062) for N times, obtaining N new particles, completing particle update, and using positions of the particles finally updated as locations of the robot in the world coordinate system.

Preferably, in the embodiment, the feature road sign image information is also integrated; if the RGB-D camera shows that there is no livestock and poultry house information in the image, and a distance between a current positioning global coordinate and an edge obstacle scanned by laser is less than a threshold, the autonomous navigation system issues a turn signal to the motion module, moves forward to a next intersection and issues the turn signal again till a navigation mode is turned off.

Also, the present invention provides a path planning process of the autonomous navigation system, which comprises the steps of:

(1) inputting an environment map which is the global map autonomously constructed by the robot in the step (S6), rasterizing the global map, estimating a pose of the robot by Monte Carlo algorithm, and mapping a global map of the robot after occupying grids with a pose of a real working environment;

(2) inputting a pose of a navigation target;

(3) the main control module of the autonomous navigation system integrating the above-mentioned information, performing global path planning through Dijkstra's algorithm and obtaining an optimal path; and (4) the main control module of the autonomous navigation system performing local real-time planning, transmitting control signals of a linear velocity and angular velocity of the robot to the motion module, and completing motor control of the robot for realizing autonomous navigation and movement of the robot.

Preferably, the inputted environment map in the step (1) is an environment map autonomously constructed or an existing working environment map; if the inputted environment map in the step (1) is the existing working environment map, the mapping is omitted, the route planning is directly performed after completing the map format conversion.

Preferably, the global path planning in the step (3) is to plan an overall path according to a given target location and a global map, calculate an optimal route from the robot to the given target location as a global route of the robot.

Preferably, the local real-time planning in the step (4) is to use the dynamic window approach to plan and change the route of each cycle according to the map information and possible obstacles nearby, comprehensively evaluate the time, collision and other conditions to select the optimal route, and calculate the linear velocity and angular velocity during the travel cycle, so as to achieve real-time obstacle avoidance.

On the basis of the LiDAR and the odometer, the present invention adds the positioning information and the characteristic image information of the inertial measurement unit, and utilizes the advantages and complementarity of various positioning in a cooperative manner, thereby obtaining the optimal solution of the state vector of the robot; and then utilizes the rapid and accurate characteristics of image information processing to effectively solve the unique positioning problem under the symmetrical mode in the livestock and poultry house, thereby forming high-precision pose prediction information, and reducing the particles in the real-time positioning and composition of the Monte Carlo algorithm, which is able to further improve the positioning accuracy of the robot (low-power processor), ensure the positioning effect of the robot with the perception capability of livestock and poultry information in a symmetrical environment, complete the mapping, and meet the application requirements of the livestock and poultry house environment.

Through the effective combination of the laser, the odometer, the inertial measurement unit and the image information, the present invention is able to realize autonomous mapping and path planning, realize autonomous navigation in working environment, and use the environmental detection sensor module and the wireless transmission module to collect and transmit a variety of environmental information, animal behavior and health information in real time, so that the problems of low efficiency, high cost, and heavy dependence on breeders of existing livestock and poultry house inspection method are solved.

At the same time, the present invention integrates the laser, the odometer, the inertial measurement unit and image information, utilizes the advantages and complementarity of various positioning in a collaborative manner, combines the characteristics of precise and fast feature road sign recognition, and forms highly accurate pose prediction information, thereby reducing the particles in the real-time positioning and the mapping approach of the Monte Carlo algorithm, greatly improving the positioning accuracy of the robot (low-power processor). Accordingly, the positioning accuracy of the robot in the livestock and poultry house is further improved.

Compared with the prior art, the present invention has significant advantages as follows.

(1) The present invention combines the robot with the autonomous navigation technology to provide a robot with perception capability of livestock and poultry information and a mapping approach based on autonomous navigation, which replaces the breeder for daily inspection work, and realizes unmanned autonomous detection of environmental information and automatic collection of animal behavior in the structured livestock and poultry breeding environment.

(2) Combining with the Kalman filter algorithm, the observation model of the Kalman filter is constructed based on the observation model of the odometer, the observation model of the inertial measurement unit and the observation model of the LiDAR; and further, the present invention adds the positioning information and the characteristic image information of the inertial measurement unit on the basis of the conventional LiDAR and the odometer, and utilizes the advantages and complementarity of various positioning in a cooperative manner, thereby obtaining the optimal solution of the state vector of the robot.

(3) Combined with the characteristics of accurate and fast road sign recognition, the highly accurate pose prediction information is formed, thereby reducing the particles in the real-time positioning and the mapping approach of the Monte Carlo algorithm, which is able to greatly improve the positioning accuracy of the robot (low-power processor), ensure the positioning effect of the robot with perception capability of livestock and poultry information in a symmetrical environment, complete the mapping, and meet the application requirements of the livestock and poultry house environment.

(4) For the first time, the Robot Operation System (ROS) is applied as a robot operating system to the livestock and poultry breeding industry. With simultaneous localization and mapping (SLAM) technology as the core, Kalman filter algorithm and particle filter algorithm are integrated to realize the path planning of the robot, which facilitates the subsequent secondary development of products.

The present invention overcomes the severe dependence of existing technologies and applications on the breeders, and aims to replace the breeders with a robot with perception capability of livestock and poultry information based on autonomous navigation without changing the structure of the breeding environment itself for daily inspection work, so as to realize the automatic detection of environmental information and animal behavior (health status) of the breeding environment, prevent the adverse effects caused by people entering the livestock and poultry houses, and provide the technical guarantee for the sustainable and healthy development of livestock and poultry breeding and animal husbandry. Therefore, the present invention has the advantages of high efficiency, high economic benefit and wide applicability, and has extremely high industry value and application value.

In the drawings, 1: direct current (DC) motor unit; 2: microcontroller; 3: four-wheeled vehicle; 4: push-rod motor unit; 5: inertial measurement unit; 6: thermal imager; 7: elevating platform; 8: environmental detection sensor module; 9: red-green-blue-depth (RGB-D) camera; 10: light detection and ranging (LiDAR); 11: wireless transmission module; 12: main control module; 13: power management module; 14: push-rod motor; 15: wheel; 16: output shaft; 17: DC motor.

DETAILED DESCRIPTION OF THE PREFERRED EMBODIMENT

In order to make the objectives, technical solutions and advantages of the present invention clearer, the technical solutions, principles and features of the present invention will be described with accompanying drawings as follows. The embodiments cited are only used to explain the present invention, not to limit the scope of the present invention. Based on the embodiments of the present invention, other embodiments obtained by those skilled in the art without creative work shall fall within the protective scope of the present invention.

Figure 1:
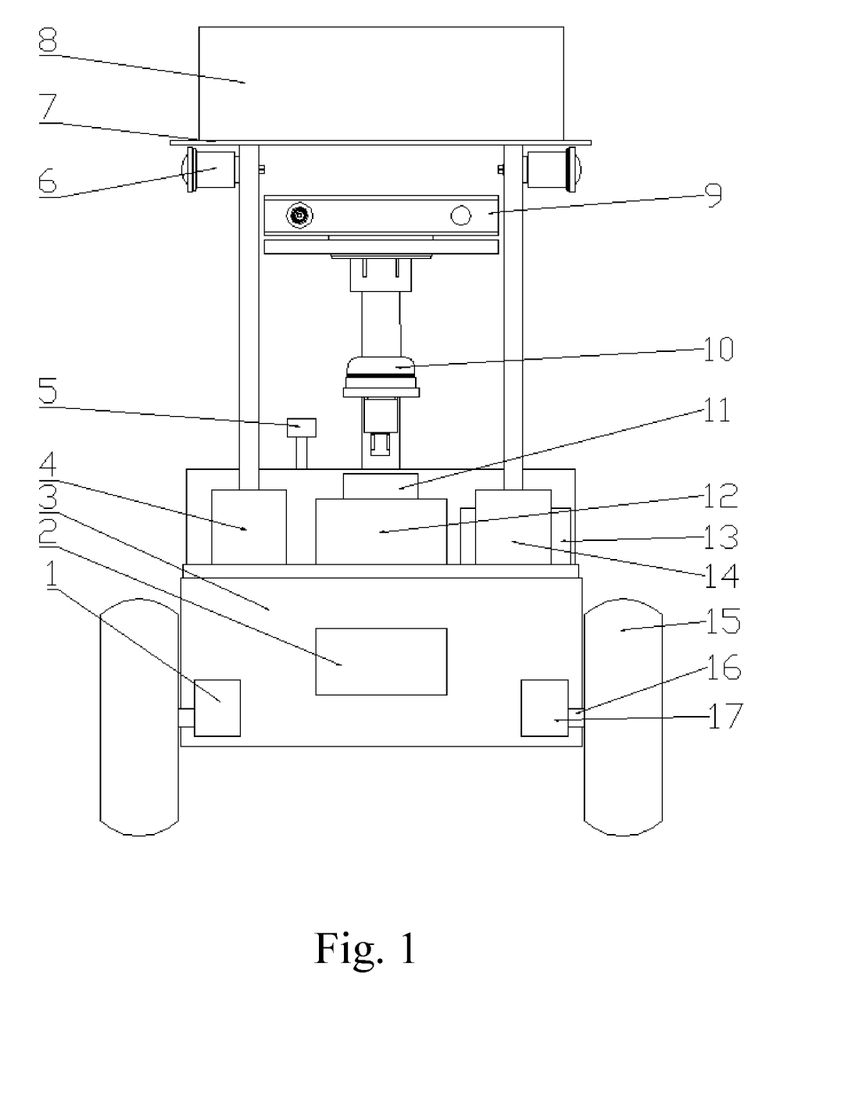
FIG. 1 is a structurally schematic view of a robot with perception capability of livestock and poultry information based on autonomous navigation provided by the present invention.

Referring to FIG. 1 of the drawings, a robot with perception capability of livestock and poultry information based on autonomous navigation is illustrated, which comprises a four-wheeled vehicle 3, an elevating platform 7 located above the four-wheeled vehicle 3, and an autonomous navigation system, a motion module and an information acquisition module three of which are installed on the four-wheeled vehicle 3.

As shown in FIG. 1, the autonomous navigation system comprises a light detection and ranging (LiDAR) 10 for obtaining information about surrounding environment, a red-green-blue-depth (RGB-D) camera 9, an inertial measurement unit 5, an odometer and a main control module 12 for information processing and control, wherein the LiDAR 10, the RGB-D camera 9, the inertial measurement unit 5, the odometer and the main control module 12 are fixed to the four-wheeled vehicle 3; the LiDAR 10, the RGB-D camera 9, the inertial measurement unit 5 and the odometer are connected with the main control module 12; the RGB-D camera 9 and the LiDAR 10 are located at a front end of the four-wheeled vehicle 3; the RGB-D camera 9 faces towards an advanced direction of the four-wheeled vehicle 3.

As shown in FIG. 1, the motion module comprises a direct current (DC) motor unit 1, a push-rod motor unit 4 for controlling up and down movement of the elevating platform 7, and a microcontroller 2 for controlling the rotational speed and rotational direction of the DC motor unit 1 and the push-rod motor unit 4, wherein the DC motor unit 1 comprises four DC motors 17 installed at four corners of a bottom portion of the four-wheeled vehicle 3, respectively, and the push-rod motor unit 4 comprises two push-rod motors 14 installed at the bottom of the elevating platform 7; four output shafts 16 of the four DC motors 17 are connected with four wheels 15 at the four corners of the bottom portion of the four-wheeled vehicle 3, respectively; the push-rod motor unit 4 is fixed to a lower portion of the four-wheeled vehicle 3; two output ends of the push-rod motor unit 4 are connected with the elevating platform 7 for driving the elevating platform 7 to move up and down; the DC motor unit 1 and the push-rod motor unit 4 are all connected with the microcontroller 2; the microcontroller 2 is connected with the main control module 12; the main control module 12 is configured to receive the information about the surrounding environment from the LiDAR 10 for controlling the DC motor unit 1 and the push-rod motor unit 4, so as to further drive the four-wheeled vehicle 3 and the elevating platform 7 to move.

The elevating platform 7 and the four-wheeled vehicle 3 are main components of the robot. The elevating platform 7, having an elevating function, is installed to the four-wheeled vehicle 3. Two thermal imagers 6 and an environmental detection sensor module 8 are installed to the elevating platform 7, so that information from different locations is able to be collected according to task requirements, but not limited to only realizing information perception functions.

As shown in FIG. 1, the information acquisition module comprises two thermal imagers 6 for collecting animal behavior information, an environmental detection sensor module 8 for collecting environmental information and a wireless transmission module 11 for data transmission, wherein the two thermal imagers 6 and the environmental detection sensor module 8 are all electrically connected with the wireless transmission module 11, the wireless transmission module 11 is connected with an external wireless receiver; the two thermal imagers 6 are disposed at two sides of a bottom of the elevating platform 7, respectively; the environmental detection sensor module 8 is disposed on the elevating platform 7. The two thermal imagers 6 of the information acquisition module are symmetrically disposed at the two sides of the bottom of the elevating platform 7 for simultaneously collecting and detecting behaviors of animals at different heights on both sides of the aisle of livestock and poultry houses.

Preferably, the robot further comprises a power management module 13 which is connected with the LiDAR 10, the RGB-D camera 9, the inertial measurement unit 5, the odometer, the main control module 12, the DC motor unit 1, the push-rod motor unit 4, and the microcontroller 2, wherein the power management module 13 is configured to provide components of the robot with power required for normal work.

The elevating platform 7 drives the two thermal imagers 6 and the environmental detection sensor module 8 to move up and down for perceiving and collecting environmental information required for the cages at different heights.

The LiDAR 10 is configured to measure a distance between the robot and surrounding obstacles in real time; the RGB-D camera 9 is configured to obtain RGB images and depth information of the surrounding environment of the robot; the inertial measurement unit 5 is configured to obtain pose information of the robot; the odometer is configured to obtain odometer information of the robot. Based on robot operating system (ROS), the main control module 12 is able to realize autonomous mapping and path planning in combination with Kalman filter algorithm and particle filter algorithm.

The environmental detection sensor module 8 comprises multiple sensors which are but not limited to sound sensor, temperature sensor, humidity sensor, light intensity sensor, hydrogen sulfide sensor, ammonia sensor and carbon dioxide sensor.

Figure 2:
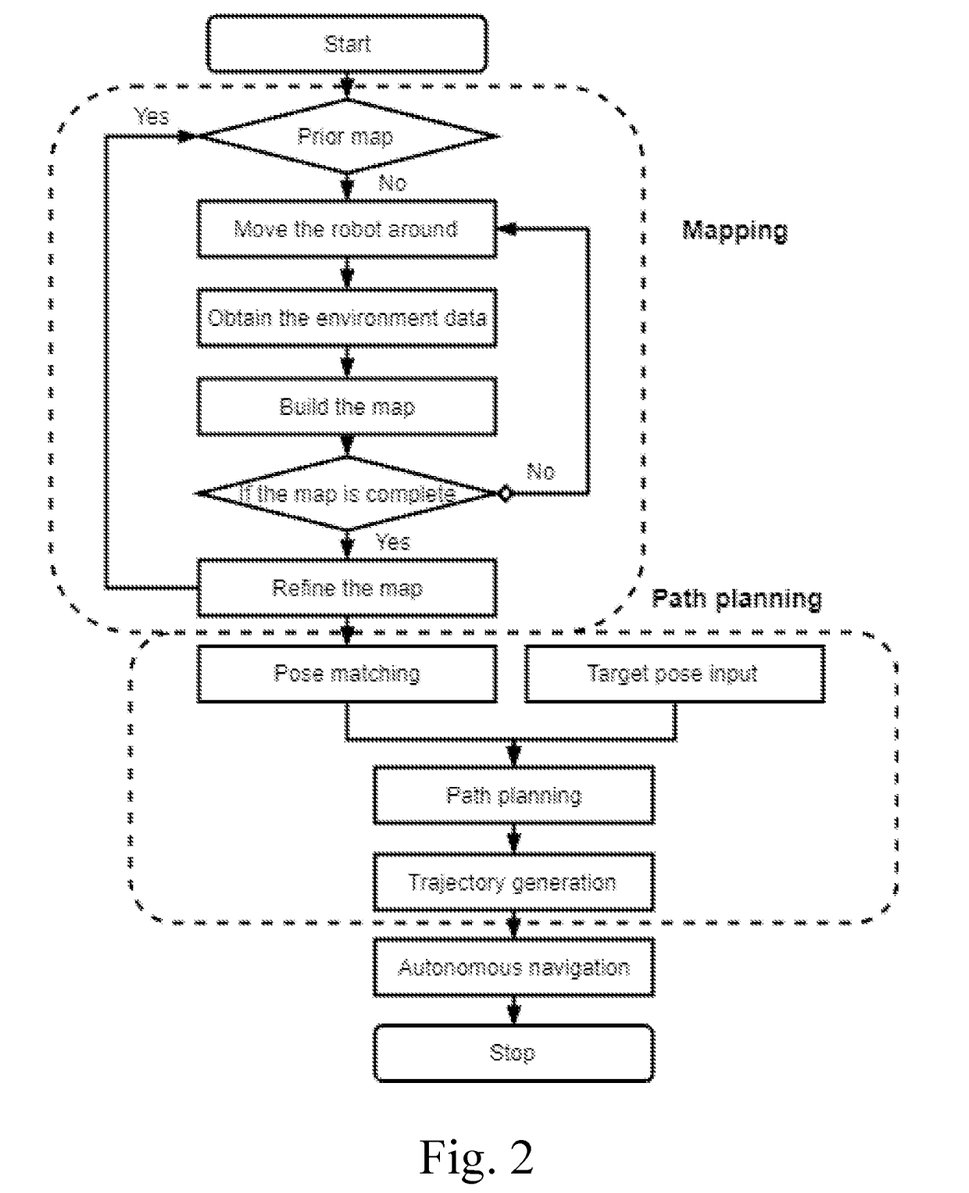
FIG. 2 is a flow chart of an autonomous navigation method of an autonomous navigation system provided by the present invention.

FIG. 2 is a flow chart of an autonomous navigation method of the autonomous navigation system provided by the present invention.

The autonomous navigation method comprises two steps of autonomous mapping and path planning.

The step of autonomous mapping comprises:
(S1) controlling the robot to move in indoor working environment based on ROS, and simultaneously obtaining information about surrounding environment during movement with the LiDAR, the RGB-D camera, the inertial measurement unit and the odometer, wherein the information comprises obstacle distance information, image and depth information, pose information and odometer information in a local coordinate system, the pose information comprises first real-time global coordinates, the odometer information comprises second real-time global coordinates, speed, heading angle and wheel angular velocity;
(S2) receiving and processing the information about the surrounding environment through the main control module, obtaining positioning global coordinates, speed, heading angle and wheel angular velocity of the robot in a world coordinate system by coordinate transformation;
(S3) defining the positioning global coordinates, speed, heading angle and wheel angular velocity of the robot in the world coordinate system to be a state vector of a Kalman filter, wherein the positioning global coordinates in the world coordinate system are obtained through processing the first real-time global coordinates and the second real-time global coordinates in the local coordinate system;
(S4) constructing a state model of the Kalman filter according to the state vector, constructing an observation model of the Kalman filter according to an observation model of the odometer, an observation model of the inertial measurement unit and an observation model of the LiDAR, solving the state model and the observation model of the Kalman filter according to Kalman filter algorithm, and obtaining an optimal solution of the state vector, wherein the step (S4) specifically comprises:

(S401): at time t, constructing the state vector $X_{c(t)} = [x_t, y_t, \theta_t, v_t, \omega_t]^T$, wherein $x_t$ and $y_t$ are the positioning global coordinates of the robot in the world coordinate system, $\theta_t$ is the heading angle of the robot in the world coordinate system, $v_t$ is the speed of the robot in the world coordinate system, $\omega_t$ is the wheel angular velocity of the robot in the world coordinate system, and T is matrix transposition;

(S402) constructing the state model of the Kalman filter according to formulas of $$X_{c(t+1)} = f(X_{c(t+1)}) + W_t,$$

$$X_{c(t+1)} = \begin{bmatrix} x_{t+1} \\ y_{t+1} \\ \theta_{t+1} \\ v_{t+1} \\ \omega_{t+1} \end{bmatrix} = \begin{bmatrix} x_t + v_t\cos(\theta_t + \omega_t\Delta t)\Delta t \\ y_t + v_t\sin(\theta_t + \omega_t\Delta t)\Delta t \\ \theta_t + \omega_t\Delta t \\ v_t \\ \omega_t \end{bmatrix} + W_t,$$

wherein $X_{c(t+1)}$ is the state vector at time t+1, $f(X_{c(t+1)})$ is a nonlinear state transition function of the state vector $X_{c(t+1)}$ at time t+1, $W_t$ is process noise of the Kalman filter, $\Delta t$ is time interval between two adjacent moments;

(S403) dividing the Kalman filter into a first sub-filter and a second sub-filter which are independent from each other and in parallel, wherein:
an observation model of the first sub-filter is expressed by $Z_{1(t+1)} = h_1 X_{c(t)} + W_{1(t)}$, which is specifically $$Z_{1(t+1)} = \begin{bmatrix} Z_{Las} \\ Z_{IMU} \end{bmatrix} = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 0 & 1 \end{bmatrix} X_{c(t)} + W_{1(t)},$$

here, $Z_{Las}$ is the observation model of the LiDAR, $Z_{IMU}$ is the observation model of the inertial measurement unit, $W_{1(t)}$ is a sum of noise of the LiDAR and the inertial measurement unit, $h_1$ is an observation matrix of the first sub-filter, an observation model of the second sub-filter is expressed by $Z_{2(t+1)} = h_2 X_{c(t)} + W_{2(t)}$, which is specifically $$Z_{2(t+1)} = \begin{bmatrix} Z_{odom} \\ Z_{IMU} \end{bmatrix} = \begin{bmatrix} 1 & 0 & 0 & 0 & 0 \\ 0 & 1 & 0 & 0 & 0 \\ 0 & 0 & 0 & 1 & 0 \\ 0 & 0 & 0 & 0 & 1 \\ 0 & 0 & 1 & 0 & 0 \\ 0 & 0 & 0 & 0 & 1 \end{bmatrix} X_{c(t)} + W_{2(t)},$$

here, $Z_{odom}$ is the observation model of the odometer, $W_{2(t)}$ is a sum of noise of the odometer and the inertial measurement unit, $h_2$ is an observation matrix of the second sub-filter; and (S404) processing covariance $Q_{(t)}$ and estimated error covariance $P_{(t)}$ of the process noise $W_t$ of the Kalman filter through formulas of $Q_{1(t')} = \alpha_1^{-1} Q_{(t)}$, $P_{1(t')} = (1-\alpha_1^{-1}) P_{(t)}$, $Q_{2(t')} = \alpha_2^{-1} Q_{(t)}$, $Q_{2(t')} = \alpha_2^{-1} Q_{(t)}$, $\overline{X}_{c(t)} = \overline{X}_{l(t)}$;

(S5) constructing a motion state transition model and a motion observation model of Monte Carlo algorithm, which comprises:
(S501) determining the optimal solution of the state vector under the state model and the observation model of the Kalman filter in the step (S4) in combination with image information collected by the RGB-D camera and Monte Carlo real-time positioning and mapping algorithm;
(S502) the robot moving in an area to be constructed on a map, judging whether the robot turns and whether there are obstacles during movement through the obstacle distance information collected by the LiDAR, judging whether there are characteristic road markings are captured through the image information collected by the RGB-D camera, performing feature matching on information collected by the LiDAR, the inertial measurement unit and the odometer in the area to be constructed on the map, and obtaining poses in the world coordinate system; and
(S503) when the robot does not turn, no obstacles or no characteristic road markings are captured by the RGB-D camera during the movement of the robot, defining control vectors of the state model of the Kalman filter to be the poses in the world coordinate system;
when the robot turns, there are obstacles or characteristic road markings are captured by the RGB-D camera during the movement of the robot, defining the control vectors of the state model of the Kalman filter to be the optimal solution of the state vector, namely, five values contained in the state vector; and
(S6) iteratively solving the state model and the observation model of the Kalman filter by a subsequent particle iteration update processing, obtaining locations, and constructing a global map, wherein the step (S6) specifically comprises:
(S601) converting the motion observation model to a likelihood function;
(S602) evenly dividing the area to be constructed on the map into multiple grids, scanning the area to be constructed on the map with the LiDAR, setting a grid with obstacles to 1, setting a grid without obstacles to 0, and obtaining a local grid map which is regarded as an initial global map;
(S603) creating particles based on Monte Carlo algorithm, taking positions of the particles as possible locations of the robot, performing weight fusion on the second real-time global coordinates obtained by the odometer and the first real-time global coordinates obtained by the inertial measurement unit in the world coordinate system, and obtaining new locations of the robot, which is expressed by formulas of $P^i = P_{odam} \cdot \theta_{\Delta t} + P_{IMU} \cdot (1 - \theta_{\Delta t'})$, $\theta_{(\Delta t')} = \dfrac{1}{1 + \left(\dfrac{\Delta t'}{\gamma}\right)^{2n}}$, here, P is a position after weight and fusion, $P_{odam}$ is the second real-time global coordinates obtained by the odometer in the world coordinate system, $P_{IMU}$ is the first real-time global coordinates obtained by the inertial measurement unit in the world coordinate system, $\theta_{\Delta t'}$ is weight of the odometer, $\Delta t'$ is location duration time, $\gamma$ is stable location duration time that the second real-time global coordinates obtained by the odometer in the world coordinate system reaches, n is time index parameter which depends on actual situations and is generally 3;
(S604) describing a particle weight update method by Gaussian distribution with a mean value of 0 and a variance of $\sigma^2$, and updating a particle weight of the Monte Carlo algorithm, wherein the updated particle weight is expressed by a formula of $$w_k^j = \dfrac{1}{\sqrt{2\pi}\,\sigma} e^{\dfrac{-(x_k^j - x_0^i)^2 - (y_k^j - y_0^j)^2}{2\sigma^2}},$$

here, $(x_k^i, y_k^i)$ is position of the $i^{th}$ particle at time k, e is natural constant, $x_0^i$ and $y_0^i$ are initial positions of the $i^{th}$ particle, $\omega_k^i$ is weight of the $i^{th}$ particle at time k, k is time, and then normalizing the updated particle weight;
(S605) calculating a current location of the robot according to the normalized updated particle weight through a formula of $X_k = \Sigma_{i=1}^n (\omega_k^i \cdot P^i)$, here, n is a total number of the particles, $P^i$ is a position of the $i^{th}$ particle after weight and fusion; and
(S606) according to the normalized updated particle weight, abandoning particles with less weight $\omega_k^i$ and remaining particles with larger weight, which comprises:
(S6061) performing polynomial resample on the updated weights of all particles, and constructing a discrete cumulative distribution function by a formula of $F(i) = \Sigma_{m=1}^i \omega_k^i$, here, F(i) is a cumulative weight of the $i^{th}$ particle;
(S6062) generating a uniformly distributed random number set $\{u_j\}$ on [0,1], wherein $u_j$ is a set of random numbers generated above, j is the $j^{th}$ random number randomly generated in the set above, and judging the weight $\omega_k^i$, wherein the weight $\omega_k^i$ is smaller if $F_{(i)} \leq u_j$; the weight $\omega_k^i$ is larger if $F_{(i)} > u_j$, copying a current particle as a new particle, and setting a weight of the new particle to be 1/N; and
(S6063) repeating polynomial resample in the step (S6062) for N times, obtaining N new particles, completing particle update, and using positions of the particles finally updated as locations of the robot in the world coordinate system.

In the embodiment, the feature road sign image information is also integrated. If the RGB-D camera shows that there is no livestock and poultry house information in the image, and a distance between a current positioning global coordinate and an edge obstacle scanned by laser is less than a threshold, the autonomous navigation system issues a turn signal to the motion module, moves forward to a next intersection and issues the turn signal again till a navigation mode is turned off.

Figure 3:
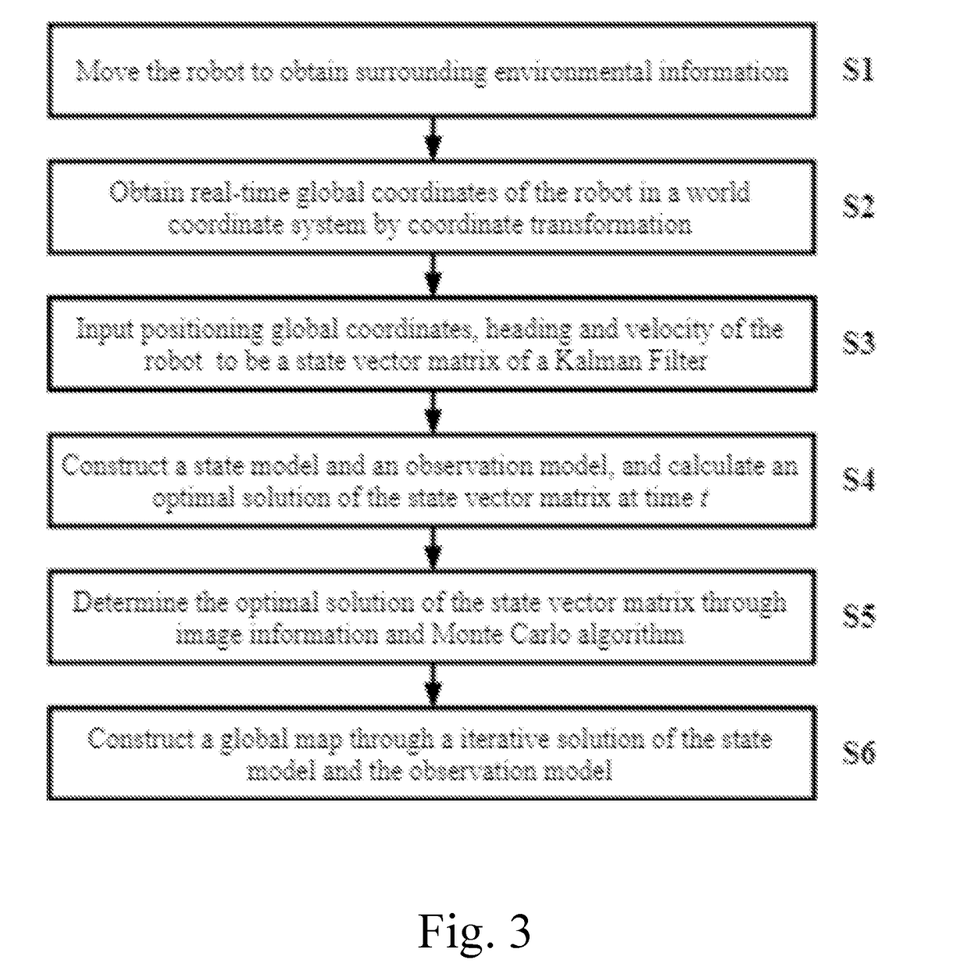
FIG. 3 is a flow chart of a mapping approach of the autonomous navigation system provided by the present invention.
Figure 4:
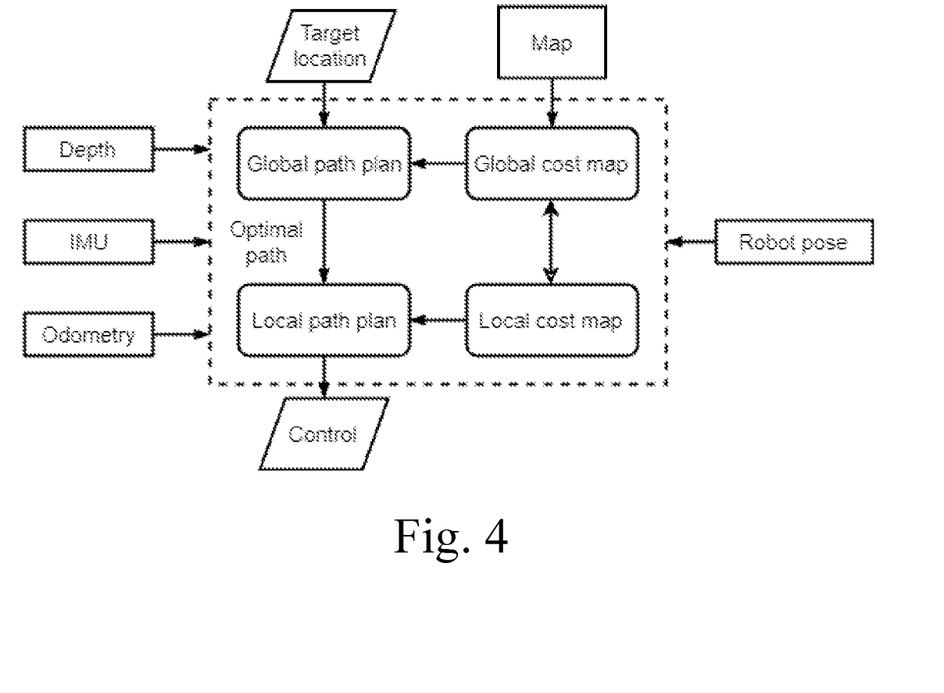
FIG. 4 is a flow chart of a path planning method of the autonomous navigation system provided by the present invention.
Figure 5:
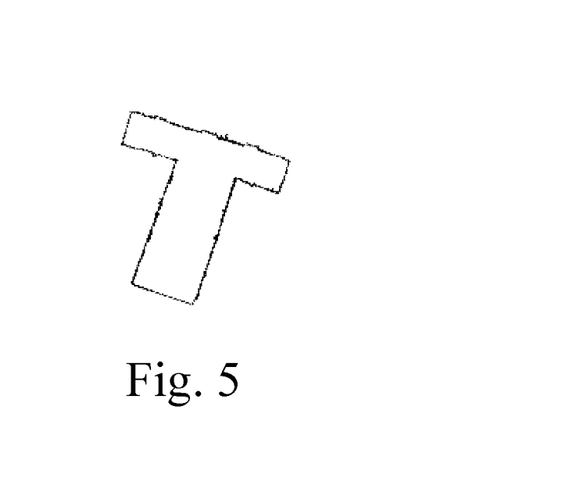
FIG. 5 shows mapping results of the autonomous navigation system provided by the present invention.

As shown in FIG. 3, the step of path planning of the autonomous navigation system comprises:
(1) inputting an environment map which is the global map autonomously constructed by the robot in the step (S6), rasterizing the global map, estimating a pose of the robot by Monte Carlo algorithm, and mapping a global map of the robot after occupying grids with a pose of a real working environment;

(2) inputting a pose of a navigation target;

(3) the main control module of the autonomous navigation system integrating the above-mentioned information, performing global path planning through Dijkstra's algorithm and obtaining an optimal path, wherein the global path planning is to plan an overall path according to a given target location and a global map, calculate an optimal route from the robot to the given target location as a global route of the robot; and (4) the main control module of the autonomous navigation system performing local real-time planning, transmitting control signals of a linear velocity and angular velocity of the robot to the motion module, and completing motor control of the robot for realizing autonomous navigation and movement of the robot.

In the local real-time planning, the dynamic window approach is used to plan and change the route of each cycle according to the map information and possible obstacles nearby, comprehensively evaluate the time, collision and other conditions to select the optimal route, and calculate the linear velocity and angular velocity during the travel cycle, so as to achieve real-time obstacle avoidance.

What is claimed is:

1. A robot with perception capability of livestock and poultry information based on autonomous navigation, the robot comprising a four-wheeled vehicle (3), an elevating platform (7) located above the four-wheeled vehicle (3), and an autonomous navigation system, a motion module and an information acquisition module, three of which are installed on the four-wheeled vehicle (3), wherein:

the autonomous navigation system comprises a light detection and ranging (LiDAR) (10) for obtaining information about surrounding environment, a red-green-blue-depth (RGB-D) camera (9), an inertial measurement unit (5), an odometer and a main control module (12) for information processing and control, wherein:

the LiDAR (10), the RGB-D camera (9), the inertial measurement unit (5), the odometer and the main control module (12) are fixed to the four-wheeled vehicle (3);

the LiDAR (10), the RGB-D camera (9), the inertial measurement unit (5) and the odometer are connected with the main control module (12);

the motion module comprises a direct current (DC) motor unit (1) for controlling the robot to move forward, a push-rod motor unit (4) for controlling up and down movement of the elevating platform (7), and a microcontroller (2) for controlling a rotational speed and a rotational direction of the DC motor unit (1) and the push-rod motor unit (4), wherein:

the DC motor unit (1) comprises four DC motors (17) installed at four corners of a bottom portion of the four-wheeled vehicle (3), respectively;

four output shafts (16) of the four DC motors (17) are connected with four wheels (15) at the four corners of the bottom portion of the four-wheeled vehicle (3), respectively;

the push-rod motor unit (4) comprises two push-rod motors (14) fixed to a top of the four-wheeled vehicle (3);

two output ends of the push-rod motor unit (4) are connected with the elevating platform (7) for driving the elevating platform (7) to move up and down;

the information acquisition module comprises two thermal imagers (6) for collecting animal behavior information, an environmental detection sensor module (8) for collecting environmental information and a wireless transmission module (11) for data transmission, wherein the two thermal imagers (6) are disposed at two sides of a bottom of the elevating platform (7), respectively; the environmental detection sensor module (8) is disposed on the elevating platform (7).

2. The robot with perception capability of livestock and poultry information based on autonomous navigation according to claim 1, further comprising a power management module (13) which is connected with the LiDAR (10), the RGB-D camera (9), the inertial measurement unit (5), the odometer, the main control module (12), the DC motor unit (1), the push-rod motor unit (4), and the microcontroller (2).

3. The robot with perception capability of livestock and poultry information based on autonomous navigation according to claim 1, wherein the DC motor unit (1) and the push-rod motor unit (4) are all connected with the microcontroller (2); the microcontroller (2) is connected with the main control module (12); the main control module (12) is configured to receive the information about the surrounding environment from the LiDAR for controlling the DC motor unit (1) and the push-rod motor unit (4), so as to further drive the four-wheeled vehicle (3) and the elevating platform (7) to move; map autonomous construction and navigation are performed by simultaneous localization and mapping (SLAM).

4. The robot with perception capability of livestock and poultry information based on autonomous navigation according to claim 1, wherein the two thermal imagers (6) and the environmental detection sensor module (8) are all electrically connected with the wireless transmission module (11), the wireless transmission module (11) is connected with an external wireless receiver; the external wireless receiver is configured to receive environmental perception information collected by the thermal imagers (6) and the environmental detection sensor module (8) for storing and processing.

5. The robot with perception capability of livestock and poultry information based on autonomous navigation according to claim 1, wherein the environmental detection sensor module (8) comprises multiple sensors which are but not limited to sound sensor, temperature sensor, humidity sensor, light intensity sensor, hydrogen sulfide sensor, ammonia sensor and carbon dioxide sensor.

6. An autonomous mapping method for the robot with perception capability of livestock and poultry information based on autonomous navigation according to claim 1, the method comprising the steps of:

(S1) controlling the robot to move in indoor working environment, and simultaneously obtaining information about surrounding environment during movement with the LiDAR, the RGB-D camera, the inertial measurement unit and the odometer, wherein the information comprises obstacle distance information, image and depth information, pose information and odometer information in a local coordinate system, the pose information comprises first real-time global coordinates, the odometer information comprises second real-time global coordinates, speed, heading angle and wheel angular velocity;

(S2) receiving and processing the information about the surrounding environment through the main control module, obtaining positioning global coordinates, speed, heading angle and wheel angular velocity of the robot in a world coordinate system by coordinate transformation;

(S3) defining the positioning global coordinates, speed, heading angle and wheel angular velocity of the robot in the world coordinate system to be a state vector of a Kalman filter, wherein the positioning global coordinates in the world coordinate system are obtained through processing the first real-time global coordinates and the second real-time global coordinates in the local coordinate system;

(S4) constructing a state model of the Kalman filter according to the state vector, constructing an observation model of the Kalman filter according to an observation model of the odometer, an observation model of the inertial measurement unit and an observation model of the LiDAR, solving the state model and the observation model of the Kalman filter according to Kalman filter algorithm, and obtaining an optimal solution of the state vector at time t;

(S5) determining the optimal solution of the state vector under the state model and the observation model of the Kalman filter in the step (S4) in combination with image information collected by the RGB-D camera and Monte Carlo real-time positioning and mapping algorithm, which comprise:

(S501) the robot moving in an area to be constructed on a map, judging whether the robot turns and whether there are obstacles during movement through the obstacle distance information collected by the LiDAR, judging whether there are characteristic road markings are captured through the image information collected by the RGB-D camera, performing feature matching on information collected by the LiDAR, the inertial measurement unit and the odometer in the area to be constructed on the map, and obtaining poses in the world coordinate system, wherein the poses are the global coordinates of the robot in the world coordinate system; and (S502) when the robot does not turn, no obstacles or no characteristic road markings are captured by the RGB-D camera during the movement of the robot, defining control vectors of the state model of the Kalman filter to be the poses in the world coordinate system;

when the robot turns, there are obstacles or characteristic road markings are captured by the RGB-D camera during the movement of the robot, defining the control vectors of the state model of the Kalman filter to be the optimal solution of the state vector; and (S6) iteratively solving the state model and the observation model of the Kalman filter, and obtaining locations, so that a global map is constructed.

7. The autonomous mapping method according to claim 6, wherein the step (S4) specifically comprises:

(S401): at time t, constructing the state vector $X_{c(t)} = [x_t, y_t, \theta_t, v_t, \omega_t]^T$, wherein $x_t$ and $y_t$ are the positioning global coordinates of the robot in the world coordinate system, $\theta_t$ is the heading angle of the robot in the world coordinate system, $v_t$ is the speed of the robot in the world coordinate system, $\omega_t$ is the wheel angular velocity of the robot in the world coordinate system, and T is matrix transposition;

(S402) constructing the state model of the Kalman filter according to formulas of $$X_{c(t+1)} = f(X_{c(t+1)}) + W_t,$$

$$X_{c(t+1)} = \begin{bmatrix} x_{t+1} \\ y_{t+1} \\ \theta_{t+1} \\ v_{t+1} \\ \omega_{t+1} \end{bmatrix} = \begin{bmatrix} x_t + v_t \cos(\theta_t + \omega_t \Delta t) \Delta t \\ y_t + v_t \sin(\theta_t + \omega_t \Delta t) \Delta t \\ \theta_t + \omega_t \Delta t \\ v_t \\ \omega_t \end{bmatrix} + W_t,$$

wherein $X_{c(t+1)}$ is the state vector at time t+1, $f(X_{c(t+1)})$ is a nonlinear state transition function of the state vector $X_{c(t+1)}$ at time t+1, $W_t$ is process noise of the Kalman filter, $\Delta t$ is time interval between two adjacent moments;

(S403) dividing the Kalman filter into a first sub-filter and a second sub-filter which are independent from each other and in parallel, wherein:

an observation model of the first sub-filter is expressed by $Z_{1(t+1)} = h_1 X_{c(t)} + W_{1(t)}$, which is specifically $$Z_{1(t+1)} = \begin{bmatrix} Z_{Las} \\ Z_{IMU} \end{bmatrix} = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 0 & 1 \end{bmatrix} X_{c(t)} + W_{1(t)},$$

here, $Z_{Las}$ is the observation model of the LiDAR, $Z_{IMU}$ is the observation model of the inertial measurement unit, $W_{1(t)}$ is a sum of noise of the LiDAR and the inertial measurement unit, $h_1$ is an observation matrix of the first sub-filter, an observation model of the second sub-filter is expressed by $Z_{2(t+1)} = h_2 X_{c(t)} + W_{2(t)}$, which is specifically $$Z_{2(t+1)} = \begin{bmatrix} Z_{odom} \\ Z_{IMU} \end{bmatrix} = \begin{bmatrix} 1 & 0 & 0 & 0 & 0 \\ 0 & 1 & 0 & 0 & 0 \\ 0 & 0 & 0 & 1 & 0 \\ 0 & 0 & 0 & 0 & 1 \\ 0 & 0 & 1 & 0 & 0 \\ 0 & 0 & 0 & 0 & 1 \end{bmatrix} X_{c(t)} + W_{2(t)},$$

here, $Z_{odom}$ is the observation model of the odometer, $W_{2(t)}$ is a sum of noise of the odometer and the inertial measurement unit, $h_2$ is an observation matrix of the second sub-filter; and (S404) processing covariance Q(t) and estimated error covariance P(t) of the process noise $W_t$ of the Kalman filter through formulas of $$Q_{1(t')} = \alpha_1^{-1} Q_{(t)},$$

$$P_{1(t')} = (1 - \alpha_1^{-1}) P_{(t)},$$

$$Q_{2(t')} = \alpha_2^{-1} Q_{(t)},$$

$$Q_{2(t')} = \alpha_2^{-1} Q_{(t)},$$

$$\overline{X}_{c(t)} = \overline{X}_{1(t)},$$

wherein $Q_{1(t')}$ is covariance of the process noise of every sub-filter at time t, $P_{1(t')}$ is estimated error covariance of every sub-filter at time t, $\alpha_1$ is weight distribution coefficient of the first sub-filter; $Q_{2(t')}$ is covariance of the process noise of every sub-filter at time t, $P_{2(t')}$ is estimated error covariance of every sub-filter at time t, $\alpha_2$ is weight distribution coefficient of the second sub-filter; $\overline{X}_{c(t)}$ is global optimal solution of state vector at time t, $\overline{X}_{l(t)}$ is global optimal solution of state vector of every sub-filter at time t.

8. The autonomous mapping method according to claim 6, wherein the step (S6) specifically comprises:
    (S601) converting a motion observation model to a likelihood function;
    (S602) evenly dividing the area to be constructed on the map into multiple grids, scanning the area to be constructed on the map with the LiDAR, setting a grid with obstacles to 1, setting a grid without obstacles to 0, and obtaining a local grid map which is regarded as an initial global map;
    (S603) creating particles based on Monte Carlo algorithm, taking positions of the particles as possible locations of the robot, performing weight fusion on the second real-time global coordinates obtained by the odometer and the first real-time global coordinates obtained by the inertial measurement unit in the world coordinate system, and obtaining new locations of the robot, which is expressed by formulas of $$P^i = P_{odam} \cdot \theta_{\Delta t} + P_{IMU} \cdot (1 - \theta_{\Delta t'}),$$

$$\theta_{(\Delta t')} = \frac{1}{1 + \left(\frac{\Delta t'}{\gamma}\right)^{2n}},$$

here, P is a position after weight and fusion, $P_{odam}$ is the second real-time global coordinates obtained by the odometer in the world coordinate system, $P_{IMU}$ is the first real-time global coordinates obtained by the inertial measurement unit in the world coordinate system, $\theta_{\Delta t'}$ is weight of the odometer, $\Delta t'$ is location duration time, $\gamma$ is stable location duration time that the second real-time global coordinates obtained by the odometer in the world coordinate system reaches, n is time index parameter which depends on actual situations and is generally 3;
    (S604) describing a particle weight update method by Gaussian distribution with a mean value of 0 and a variance of $\sigma^2$, and updating a particle weight of the Monte Carlo algorithm, wherein the updated particle weight is expressed by a formula of $$w_k^i = \frac{1}{\sqrt{2\pi}\,\sigma} e^{\frac{-(x_k^i - x_0^i)^2 - (y_k^i - y_0^i)^2}{2\sigma^2}},$$

here, $(x_k^i, y_k^i)$ is position of the $i^{th}$ particle at time k, e is natural constant, $x_0^i$ and $y_0^i$ are initial positions of the $i^{th}$ particle, $\omega_k^i$ is weight of the $i^{th}$ particle at time k, k is time, and then normalizing the updated particle weight;
    (S605) calculating a current location of the robot according to the normalized updated particle weight through a formula of $$X_k = \Sigma_{i=1}^n (\omega_k^i \cdot P^i),$$

here, n is a total number of the particles, $P^i$ is a position of the $i^{th}$ particle after weight and fusion; and
    (S606) according to the normalized updated particle weight, abandoning particles with less weight $\omega_k^i$ and remaining particles with larger weight, which comprises:
    (S6061) performing polynomial resample on the updated weights of all particles, and constructing a discrete cumulative distribution function by a formula of $$F(i) = \Sigma_{m=1}^i \omega_k^i,$$

here, F(i) is a cumulative weight of the $i^{th}$ particle;
    (S6062) generating a uniformly distributed random number set $\{u_j\}$ on [0,1], wherein $u_j$ is a set of random numbers generated above, j is the $j^{th}$ random number randomly generated in the set above, and judging the weight $\omega_k^i$, wherein the weight $\omega_k^i$ is smaller if $F_{(i)} \leq u_j$; the weight $\omega_k^i$ is larger if $F_{(i)} > u_j$, copying a current particle as a new particle, and setting a weight of the new particle to be 1/N; and
    (S6063) repeating polynomial resample in the step (S6062) for N times, obtaining N new particles, completing particle update, and using positions of the particles finally updated as locations of the robot in the world coordinate system.

\* \* \* \* \*